(12) United States Patent
Soltis et al.

(10) Patent No.: US 7,490,591 B2
(45) Date of Patent: Feb. 17, 2009

(54) METHOD AND APPARATUS FOR ELIMINATING SPARK-KNOCK IN AN ENGINE

(75) Inventors: Dennis A. Soltis, Lake Orion, MI (US); Arthur D. Stockard, Roseville, MI (US)

(73) Assignee: Chrysler LLC, Auburn Hills, MI (US)

( * ) Notice: Subject to any disclaimer, the term of this patent is extended or adjusted under 35 U.S.C. 154(b) by 29 days.

(21) Appl. No.: 11/776,117

(22) Filed: Jul. 11, 2007

(65) Prior Publication Data
US 2009/0013964 A1 Jan. 15, 2009

(51) Int. Cl.
*F02B 31/06* (2006.01)
(52) U.S. Cl. ............... 123/429; 123/432; 123/406.29; 123/308; 123/188.14
(58) Field of Classification Search ........... 123/188.14, 123/308, 429, 432, 406.29, 406.4, 406.45
See application file for complete search history.

(56) References Cited

U.S. PATENT DOCUMENTS

| 4,823,753 | A | * | 4/1989 | Murakami et al. | 123/306 |
|---|---|---|---|---|---|
| 5,394,845 | A | * | 3/1995 | Noh et al. | 123/308 |
| 5,670,715 | A | * | 9/1997 | Tomisawa | 73/114.72 |
| 5,927,245 | A | * | 7/1999 | Uchida | 123/301 |
| 5,970,948 | A | * | 10/1999 | Yasuoka | 123/295 |
| 6,092,502 | A | * | 7/2000 | Atago et al. | 123/301 |
| 6,135,085 | A | * | 10/2000 | Toyohara et al. | 123/306 |
| 6,651,614 | B2 | * | 11/2003 | Flamig-Vetter et al. | 123/301 |
| 7,137,380 | B1 | * | 11/2006 | Ookubo et al. | 123/306 |
| 2007/0163555 | A1 | * | 7/2007 | Hong | 123/590 |

* cited by examiner

*Primary Examiner*—Erick Solis
(74) *Attorney, Agent, or Firm*—Ralph E. Smith

(57) ABSTRACT

An apparatus for minimizing spark-knock within a combustion chamber of a spark-ignition internal combustion engine, whereby a control vane mounted inside the intake runner is arranged to direct a fuel-air charge to a region inside the combustion chamber where spark-knock has been empirically determined to occur.

8 Claims, 4 Drawing Sheets

METHOD AND APPARATUS FOR ELIMINATING SPARK-KNOCK IN AN ENGINE

FIELD OF THE INVENTION

The present invention relates to eliminating spark-knock in an internal combustion engine, and more particularly to eliminating spark-knock by directing intake airflow charge to an identified area of the combustion chamber where knock is known to occur.

BACKGROUND OF THE INVENTION

Spark-knock, otherwise known as detonation or auto-ignition, is a detrimental phenomenon that can occur in a cylinder of a spark-ignition internal combustion engine of the type generally used in motor vehicles. Spark-knock occurs when fuel inside the cylinder combustion chamber is prematurely detonated as a result of rapid temperature and pressure rise due to combined compression by the piston and the ignition by a spark plug of the inlet fuel-air charge. Consequences of spark-knock can be loss of power, degradation in engine durability, and/or an increase in undesirable exhaust emissions.

One approach for minimizing spark-knock in the automotive industry is to vary the engine's spark timing. A knock-sensor, a type of accelerometer located on the engine block, is configured to detect knock-induced engine block vibrations, and is then used to generate a signal to the engine computer to retard ignition timing. The net effect of this approach is that while knock is minimized or eliminated, retarding of spark can also have an undesirable impact on the engine's power and overall efficiency during the affected operating cycle.

Another approach for combating spark-knock is to reduce an engine's static compression ratio. While reducing the compression ratio dispenses with the need for a knock-sensor, such an approach can reduce engine power and overall efficiency under all operating conditions.

In view of the above, it is therefore apparent that an efficient method of eliminating spark-knock in spark-ignition internal combustion engines while retaining full engine performance under most operating conditions would be most beneficial.

SUMMARY OF THE INVENTION

The present invention is an apparatus for reducing spark-knock within a combustion chamber of a spark-ignition internal combustion engine. The spark-ignition internal combustion engine has an engine block, at least one cylinder operable to define the combustion chamber, and at least one intake runner communicating with the cylinder and arranged to deliver a fuel-air charge to the combustion chamber. According to the invention, a knock-sensor is mounted on the engine block and arranged to detect a predetermined minimum magnitude of engine block vibration which is indicative of spark-knock. The knock-sensor is arranged to communicate said spark-knock detection to an Engine Control Unit (ECU). The ECU is programmed to generate a signal based on the detection of spark-knock. A vane is mounted inside the intake runner, and is arranged to direct the fuel-air charge to a predetermined region inside the combustion chamber in response to the signal generated by the ECU. The direction of fuel-air charge to a predetermined combustion chamber region thereby causes spark-knock to be reduced, i.e. minimized to a level unlikely to be detected or be detrimental to engine function under normal operating conditions.

In a preferred embodiment, the present invention provides a vane arranged to direct the fuel-air charge to an empirically predetermined region inside a combustion chamber of an internal combustion spark-ignition engine. It has been observed that spark-knock generally occurs just prior to initiation of steady combustion via a spark-plug in a region of the combustion chamber with highest temperature and pressure. Therefore, according to the invention, spark-knock can be minimized by directing a fuel-air charge to the region where spark-knock occurs. While such operation would minimize spark-knock, continued direction of the fuel-air charge to a localized region of the combustion chamber, however, could reduce operating efficiency of the engine once steady combustion has been initiated.

Each internal combustion engine design typically results in a unique combustion process "signature", i.e. a region where spark-knock is likely to occur is particular to a specific engine design. Therefore, predetermination of the spark-knock region is preferably made empirically, during the engine development phase under controlled conditions at an instrumented test-facility. Accordingly, a development engine is run inside a test-cell, and the engine's spark timing is manually advanced until spark-knock is generated and the location of its occurrence within the combustion chamber is identified and noted. An experimental vane is subsequently arranged by trial and error inside an intake runner to direct a fuel-air charge to the region where the spark-knock was found to occur.

An aspect of the present invention includes the vane, or plates, with delayed response to onset and/or reduction of spark-knock, a so-called hysteresis, resulting in the plate's gradual activation and deactivation. Such hysteresis can be generated, for example, mechanically, by adding friction washers, or by electronic means, thereby damping the vane's movement.

An alternative embodiment of the present invention is a method for minimizing spark-knock within a combustion chamber of a spark-ignition internal combustion engine. The method includes the steps of providing a sensor to detect an occurrence of spark-knock, and then directing a fuel-air charge to the region of the combustion chamber where spark-knock is predetermined to occur. The method further includes the step of terminating directing of the fuel-air charge after disappearance of spark-knock, and wherein the directing of the fuel-air charge is commenced and terminated gradually. Additionally, the method includes the step of terminating the directing of the fuel-air charge based upon a change in a specified engine control parameter, such as Manifold Absolute Pressure (MAP) or engine speed by an empirically designated amount. As a result of reduction of spark-knock, MAP is expected to decrease, and engine speed is expected to increase.

It should be understood that the detailed description and specific examples which follow, while indicating preferred embodiments of the invention, are intended for purposes of illustration only and are not intended to limit the scope of the invention.

DETAILED DESCRIPTION

In general the present invention is directed to reducing, i.e. minimizing, spark-knock in spark-ignition internal combustion engines. More specifically, the present invention is both an apparatus and a method to accomplish same.

Figure 1:
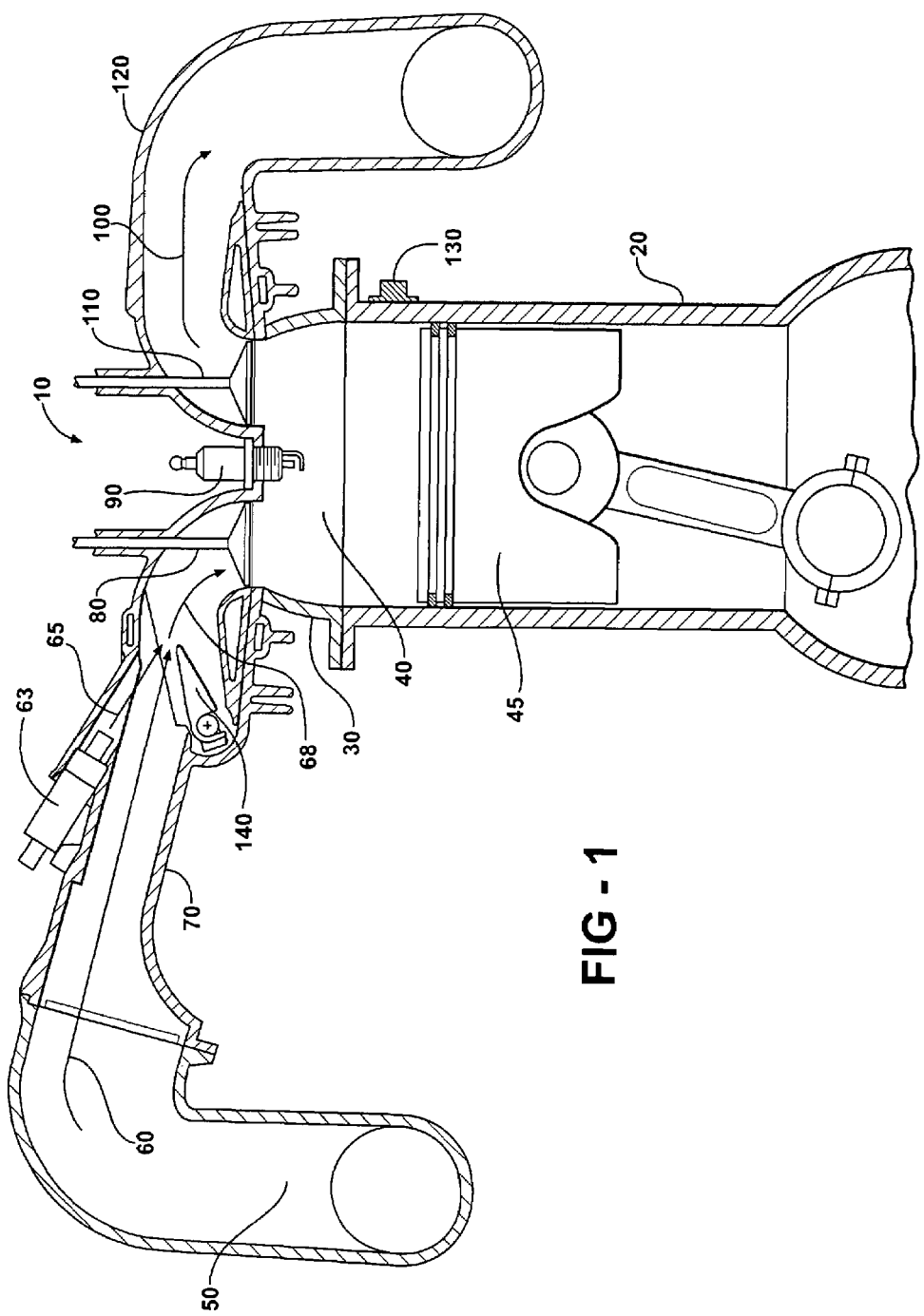
FIG. 1 is a cross-sectional view of one cylinder of a typical spark-ignition internal combustion engine.

Referring now to the drawings in which like elements of the invention are identified with identical reference numerals throughout, FIG. 1 denotes an engine assembly 10. Engine assembly 10 includes a block 20, a cylinder head 30 affixed to the block, and a reciprocating piston 40, altogether operatively defining combustion chamber 45. Engine assembly 10 further comprises an intake manifold 50 which delivers airflow charge 60 and a fuel injector 63 which delivers fuel charge 65 via intake runner 70 to combustion chamber 45 through intake valve 80. Airflow charge 60 and fuel charge 65 combine to form a fuel-air charge 68. Following a combustion event (not shown) initiated by spark plug 90, exhaust gas 100 is channeled out of combustion chamber 45 to atmosphere through exhaust valve 110 via exhaust runner 120. Engine assembly 10 further comprises knock-sensor 130, preferably an accelerometer-type sensor, mounted on block 20, and arranged to detect vibration caused by spark-knock, and to communicate such detection to an Engine Control Unit, "ECU" (not shown). A vane 140, made from any suitable material, e.g. injection molded engineering plastic, is mounted inside intake runner 70 transverse to fuel-air charge 68. Vane 140 is arranged to pivot relative to intake runner 70 into the path of fuel-air charge 68 thereby directing, or deflecting, the fuel-air charge along the intake runner. The ECU is programmed to generate an electric signal in response to detection of spark-knock, thereby activating vane 140 to direct fuel-air charge 68 to a predetermined region inside combustion chamber 45 known to generate spark-knock. As a result, flame (not shown) generated by the combustion event propagates more rapidly toward the predetermined region known to generate spark-knock. The more rapid flame propagation reduces the amount of time available for fuel-air charge 68 to heat and auto-ignite, thereby minimizing occurrence of spark-knock. The reduction of spark knock results in improved engine operation, which manifests itself as change in measurable engine control parameters, such as Manifold Absolute Pressure or engine speed.

Figure 2:
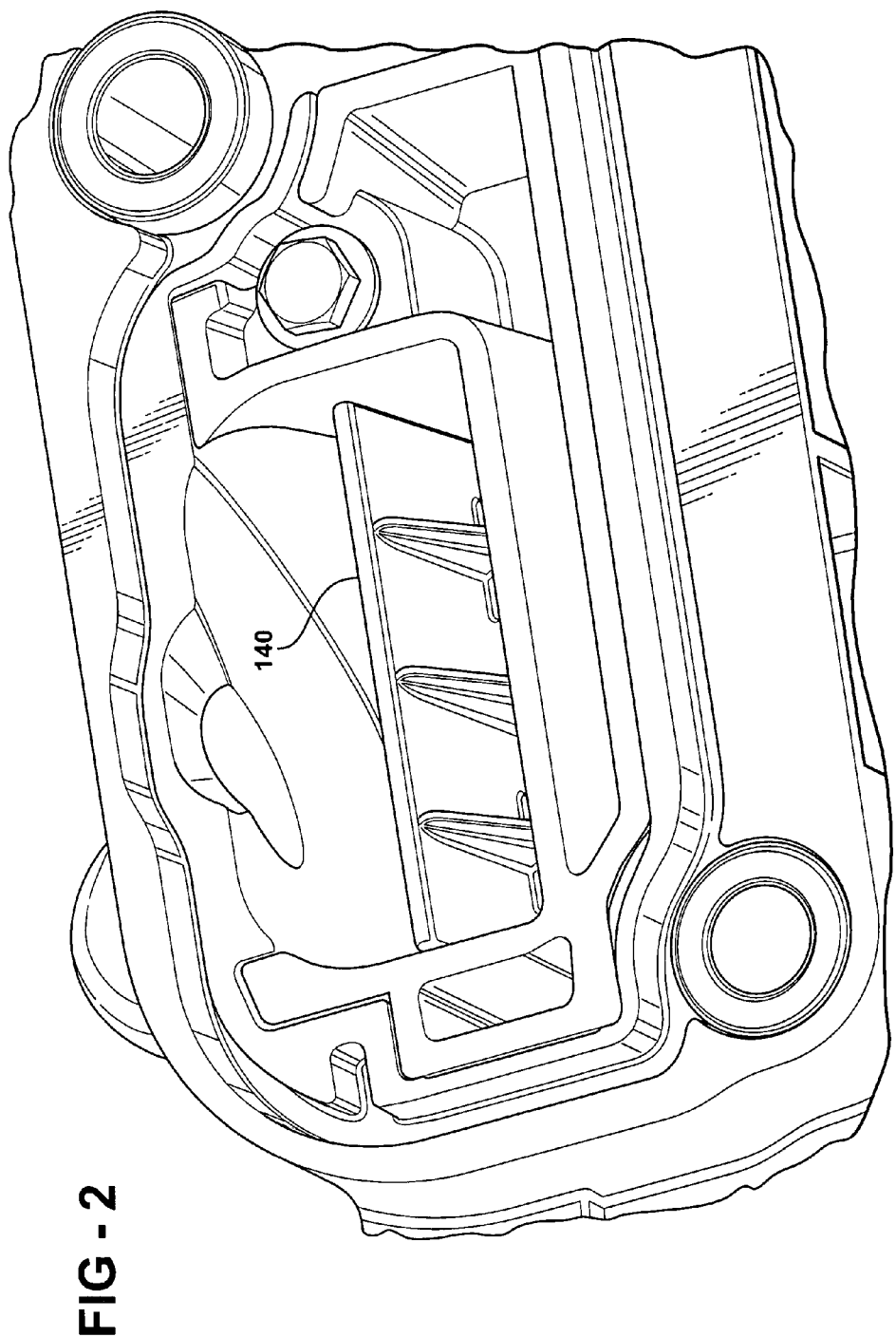
FIG. 2 is an isometric perspective view of a vane inside an engine's air intake runner in an activated state according to the invention.
Figure 3:
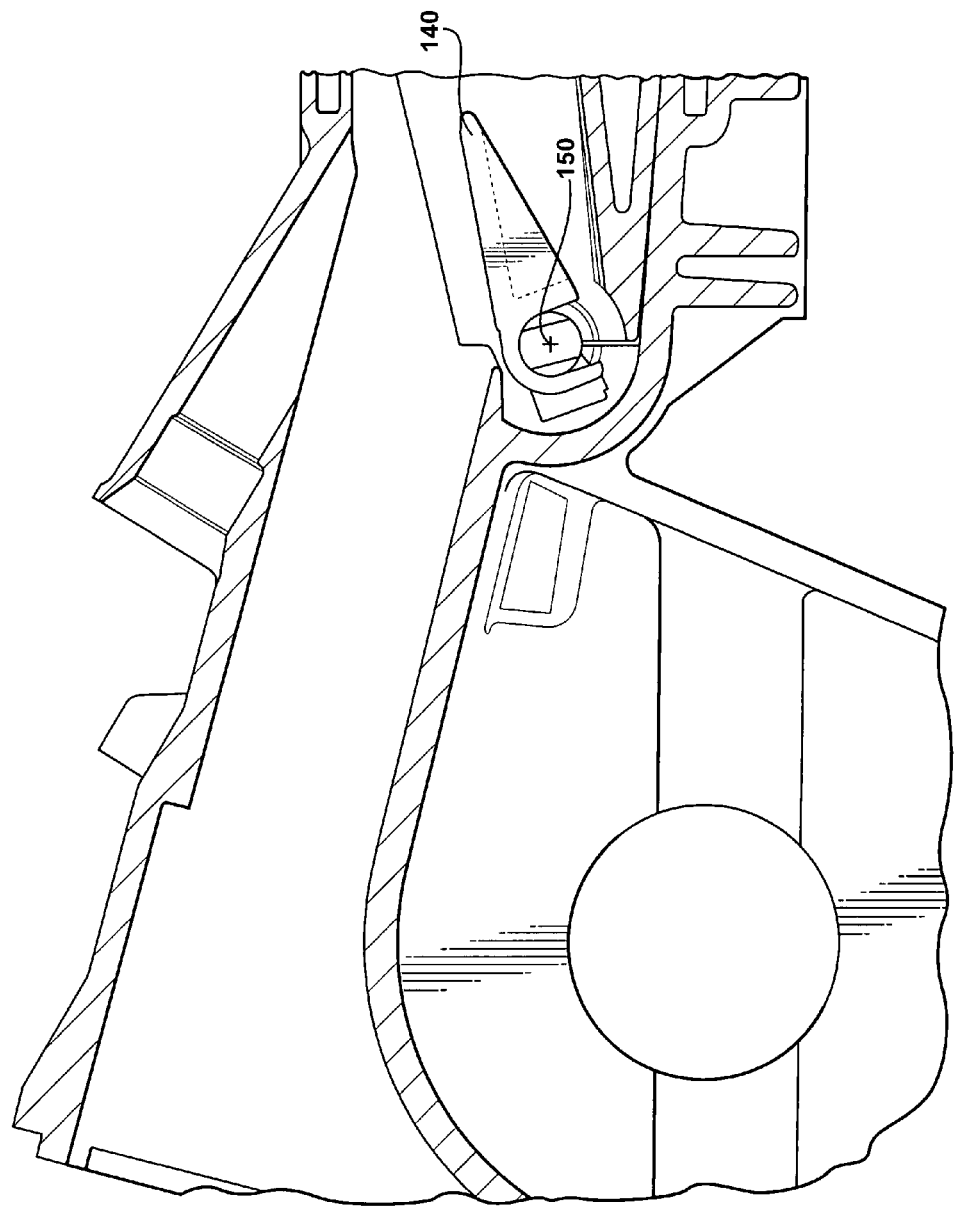
FIG. 3 is a cross-sectional side view of a vane in an activated state inside an engine's air intake runner according to the invention.
Figure 4:
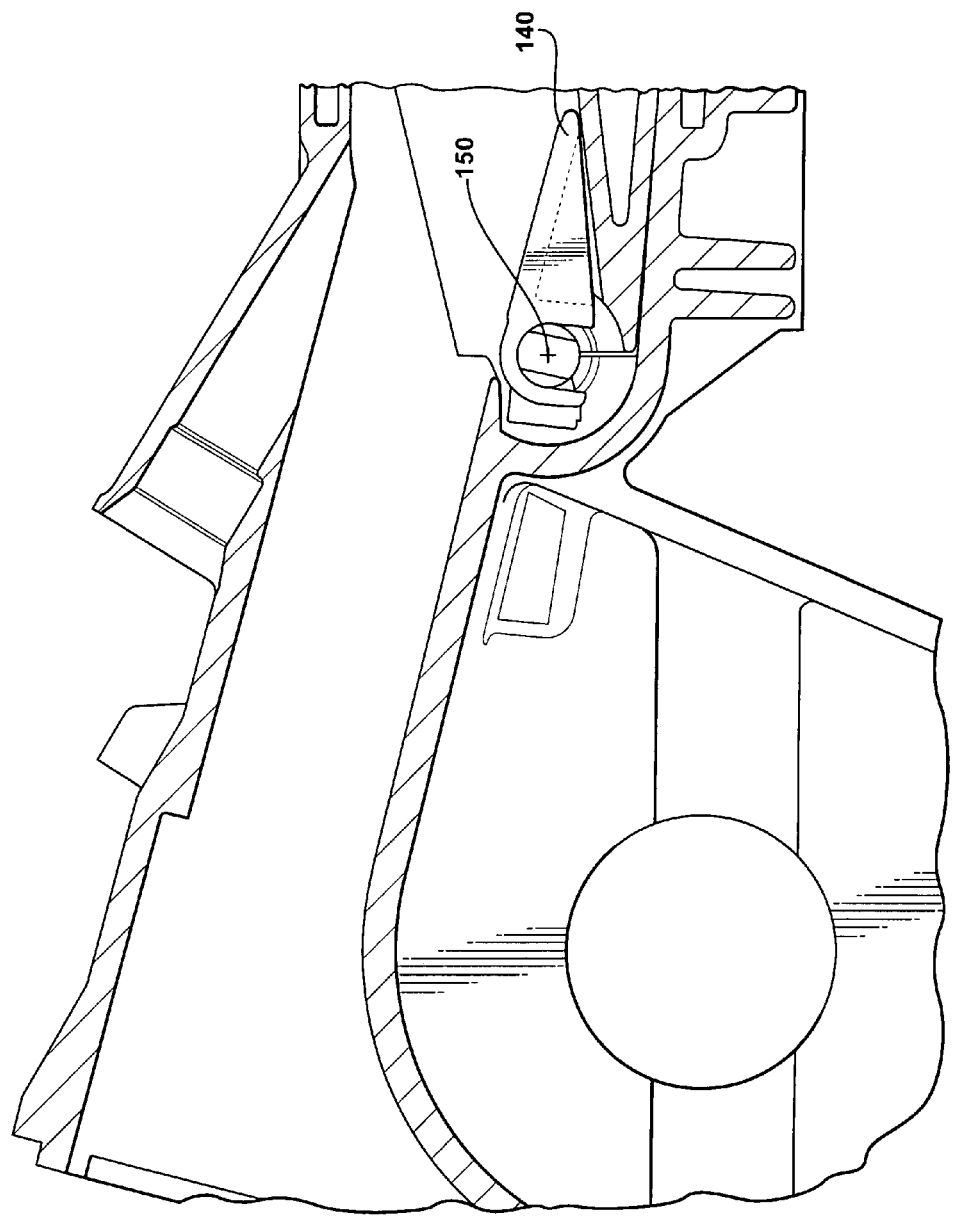
FIG. 4 is a cross-sectional side view of a vane in a deactivated state inside an engine's air intake runner according to the invention.

As best seen from FIGS. 2-4, vane 140 is arranged inside intake runner 70 to pivot about axis-shaft 150, preferably made from an engineering plastic or any other suitable material, which is mounted transverse to the intake runner. Vane 140 thereby pivots in response to the electric signal generated by the ECU to direct fuel-air charge 68 along intake runner 70 to a predetermined region inside combustion chamber 45.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for reducing spark-knock within a combustion chamber of a spark-ignition internal combustion engine comprising:
    at least one intake runner and fuel injector mounted inside the intake runner arranged to deliver a fuel-air charge to the combustion chamber;
    a knock-sensor mounted in the proximity of the combustion chamber and arranged to detect spark-knock and communicate said detection to an Engine Control Unit (ECU) programmed to generate a signal in response to said detection of spark-knock; and
    a vane mounted inside the intake runner and arranged to direct the fuel-air charge to a predetermined region inside the combustion chamber in response to the signal generated by the ECU, whereby spark-knock is minimized.

2. The apparatus of claim 1 further comprising:
    a block and a cylinder head operable to define the combustion chamber of at least one cylinder;
    the at least one intake runner and fuel injector mounted inside the intake runner communicating with the cylinder and arranged to deliver the fuel-air charge to the combustion chamber; and
    the knock-sensor mounted on the engine block and arranged to detect spark-knock and communicate said detection to an Engine Control Unit (ECU) programmed to generate a signal based on the detection of spark-knock.

3. The apparatus of claim 1 wherein the vane comprises a damping hysteresis resulting in gradual activation and deactivation of said vane.

4. The apparatus of claim 1 wherein the vane is deactivated by the ECU upon a change in a specified engine control parameter by a designated amount.

5. A method for reducing spark-knock within a combustion chamber of a spark-ignition internal combustion engine during engine operation, said method comprising:
    empirically identifying a region inside the combustion chamber where spark-knock is likely to occur;
    detecting an occurrence of the spark-knock within the combustion chamber; and
    upon detecting the occurrence of the spark-knock, directing a fuel-air charge to the region of the combustion chamber where spark-knock has been identified to occur.

6. The method of claim 5 further comprising terminating the directing of the fuel-air charge into the combustion chamber in response to a reduction of the spark-knock.

7. The method of claim 5 wherein the directing of the fuel-air charge is commenced and terminated gradually.

8. The method of claim 5 further comprising terminating the directing of the fuel-air charge in response to a change in a specified engine control parameter by a designated amount.

* * * * *